United States Patent [19]
Lee et al.

[11] Patent Number: 5,886,847
[45] Date of Patent: Mar. 23, 1999

[54] APPARATUS AND METHOD FOR AUTOMATICALLY PERFORMING CHANNEL CHANGE OF TELEVISION RECEIVER USING VIDEO CASSETTE RECORDER

[75] Inventors: Bong Soon Lee; Sung Baek Park; Man Sik Park, all of Kyungki-do; Young Deuk Ko, Seoul, all of Rep. of Korea

[73] Assignee: Goldstar Co., Ltd., Seoul, Rep. of Korea

[21] Appl. No.: 688,822

[22] Filed: Jul. 31, 1996

Related U.S. Application Data

[63] Continuation of Ser. No. 268,930, Jun. 30, 1994, abandoned.

[30] Foreign Application Priority Data

Aug. 26, 1993 [KR] Rep. of Korea .................. 1993/16682
Dec. 18, 1993 [KR] Rep. of Korea .................. 1993/28348
Dec. 22, 1993 [KR] Rep. of Korea .................. 1993/29114

[51] Int. Cl.⁶ .................................................. G11B 31/00
[52] U.S. Cl. .............................................. 360/79; 348/731
[58] Field of Search ........................ 360/79, 69; 348/725, 348/731, 734, 732, 735

[56] References Cited

U.S. PATENT DOCUMENTS

| | | | |
|---|---|---|---|
| 4,527,204 | 7/1985 | Kozakai et al. | 360/79 X |
| 4,623,887 | 11/1986 | Welles, II. | |
| 5,109,284 | 4/1992 | Jung | 360/79 X |
| 5,123,046 | 6/1992 | Levine | 360/79 X |
| 5,151,789 | 9/1992 | Young | 360/79 X |
| 5,255,180 | 10/1993 | Shinoda et al. | 348/734 X |
| 5,291,343 | 3/1994 | Goto | 348/734 X |
| 5,303,063 | 4/1994 | Kim et al. | 360/79 X |
| 5,329,376 | 7/1994 | Kim et al. | 360/79 X |
| 5,341,166 | 8/1994 | Garr et al. | 360/79 X |
| 5,420,647 | 5/1995 | Levine | 348/734 X |
| 5,448,370 | 9/1995 | Kim et al. | 348/734 X |
| 5,550,644 | 8/1996 | So | 360/79 X |
| 5,631,995 | 5/1997 | Weissensteiner et al. | 386/1 |

OTHER PUBLICATIONS

Technics, "Quartz Synthesizer AM/FM Stereo Receiver SA–GX700 Operating Instructions," c. 1990, pp. 52–59.
Sony, "SLV–595 HF/696HF Video Cassette Recorder Operating Instructions," 1992, p. 28.

*Primary Examiner*—Aristotelis M. Psitos
*Assistant Examiner*—James L. Habermehl
*Attorney, Agent, or Firm*—Finnegan, Henderson, Farabow, Garrett & Dunner, L.L.P.

[57] ABSTRACT

An apparatus for automatically performing channel change of a television receiver using a video cassette recorder includes a playback command detector for detecting a playback command, a channel sensor for sensing a video viewable channel which is selected by a radio frequency changeover switch according to a user's selection, a memory for storing the video viewable channel sensed by the channel sensor, television receiver channel change data and television receiver codes corresponding to different types of the television receiver, a controller for reading one of the television receiver channel change data stored in the memory corresponding to the video viewable channel sensed by the channel sensor upon the detection of the playback command by the playback command detector, and a remote transmitter for remotely transmitting the television receiver channel change data from the controller to the television receiver to change a current channel of the television receiver to the video viewable channel sensed by the channel sensor in a playback mode of the video cassette recorder. According to the invention, the current channel of the television receiver can automatically be changed to the video viewable channel upon input of a playback key signal or insertion of a video tape into a deck of the video cassette recorder.

16 Claims, 8 Drawing Sheets

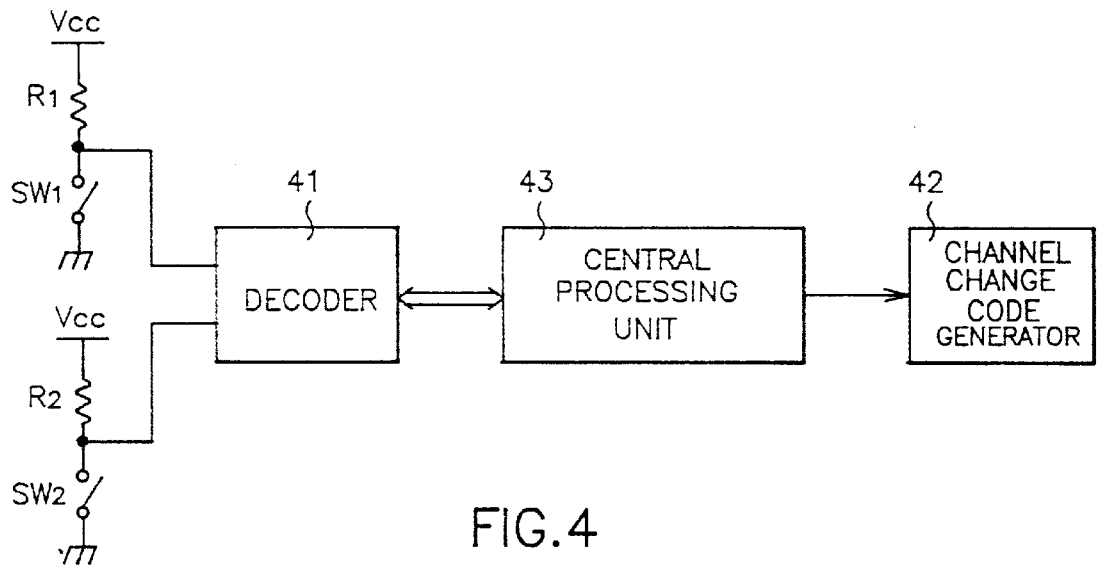
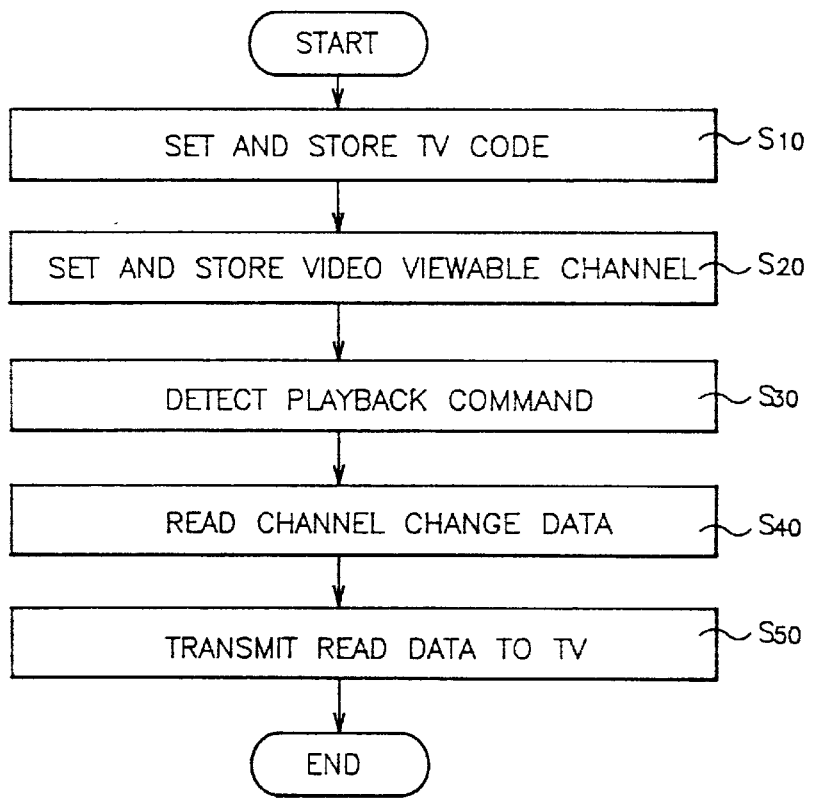

FIG.5
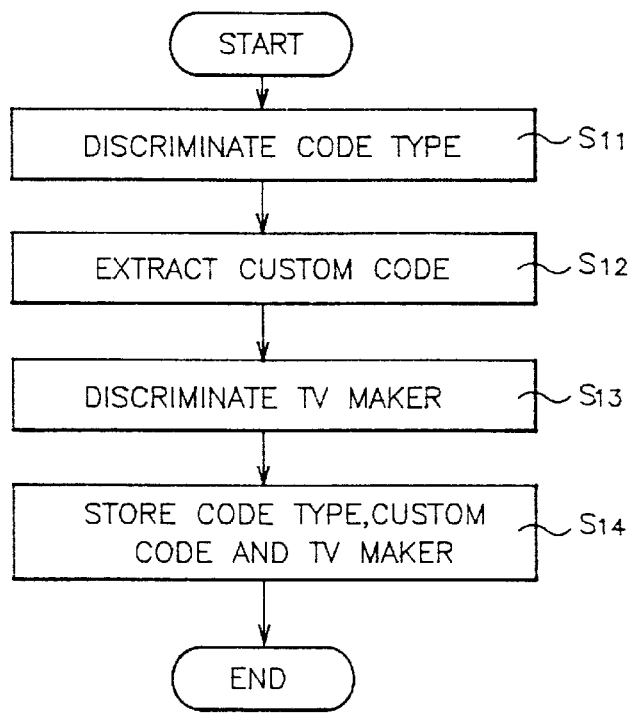
FIG.6a
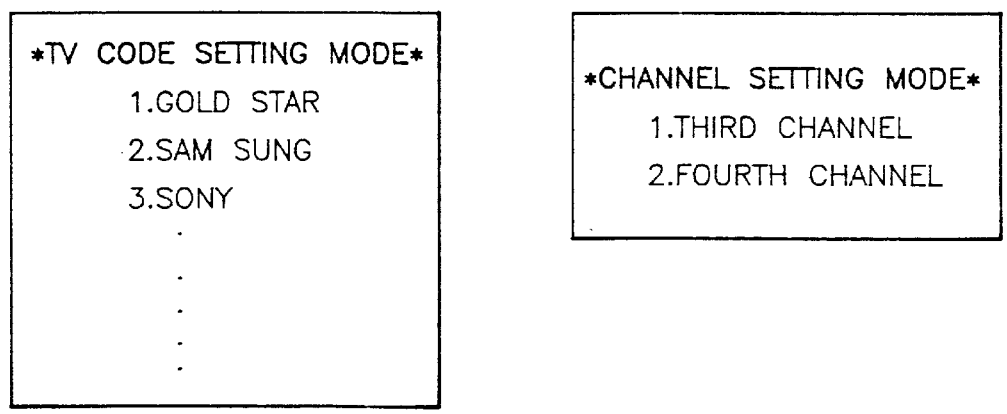
FIG.6b
FIG.7
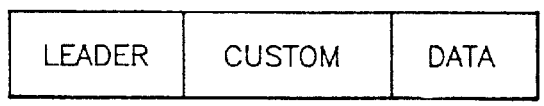

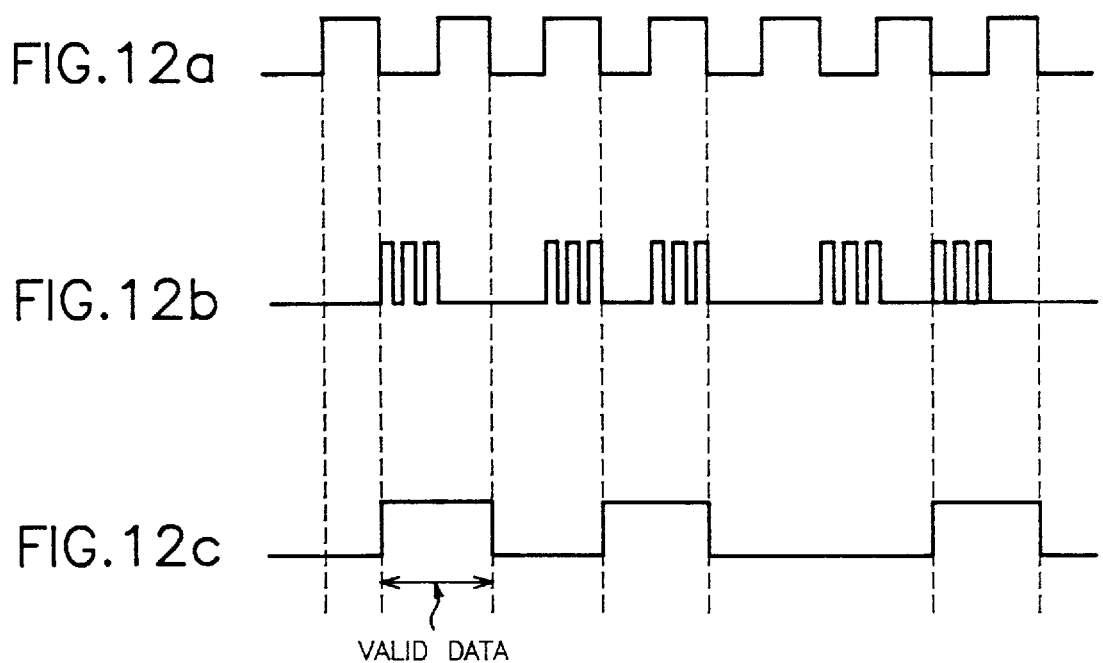

APPARATUS AND METHOD FOR AUTOMATICALLY PERFORMING CHANNEL CHANGE OF TELEVISION RECEIVER USING VIDEO CASSETTE RECORDER

This application is a continuation of application Ser. No. 08/268,930, filed Jun. 30, 1994, now abandoned.

BACKGROUND OF THE INVENTION

1. Field of the Invention

The present invention relates in general to an apparatus and a method for automatically performing channel change of a television receiver (referred to hereinafter as a TV) using a video cassette recorder (referred to hereinafter as a VCR), and more particularly to an apparatus and a method for automatically changing a current channel of the TV to a video viewable channel in a playback mode of the VCR.

2. Description of the Related Art

Referring to FIG. 1, there is shown a view illustrating a general connection of the TV and the VCR, which are designated by the reference numerals 2' and 1', respectively. As shown in this drawing, the VCR 1' has a radio frequency (RF) output terminal 1a' as a video output terminal and the TV 2' has an RF input terminal 2a', which is connected to the RF output terminal 1a' of the VCR 1' through an RF cable 3'.

In order to watch a playback video from the VCR 1' through the TV 2' under the condition that the VCR 1' and the TV 2' are connected to each other via the RF cable 3', the user must manually set the current channel of the TV 2' to the video viewable channel (for example, channel 3 or 4 in Korea). Namely, whenever the user intends to watch the playback video from the VCR 1' through the TV 2', he must apply a playback command to the VCR 1' using a VCR remote controller and change the current channel of the TV 2' to the video viewable channel using a TV remote controller.

In this connection, whenever intending to watch the playback video from the VCR through the TV, the user must go to the trouble of changing the current channel of the TV to the video viewable channel. Also, the use of two or more remote controllers results in further inconvenience. Further, even an integral TV/VCR remote controller cannot avoid all inconvenience because it must apply the channel change and playback commands to the TV and the VCR, respectively. Moreover, in the case where the video viewable channel number is changed from one known number to a different number, the user may misinterpret a normal state of the VCR or the TV as a faulty state incapable of playback video reception since he is liable to manually set the current channel of the TV to the prior video viewable channel without recognizing the channel number change.

On the other hand, a cable broadcasting signal reservation-recording technique is shown in U.S. Pat. No. 5,123,046. In this technique, reservation-recording data are stored in a memory of the VCR by the VCR remote controller, and a remote control signal is outputted from the VCR when the current time reaches a reservation-recording time of the reservation-recording data stored in the memory of the VCR. In response to the remote control signal from the VCR, a reservation-recording operation is automatically performed with respect to a cable broadcasting signal through a cable box. However, this technique does not relate to the control of the TV, but rather to the control of the cable box by means of the VCR.

A system for automatic recording cable television programs is disclosed in U.S. Pat. No. 5,151,789. In this system, a video recorder is remote controlled to record slected programs at their broadcast times. However, this system does not relate to the control of the TV.

SUMMARY OF THE INVENTION

Therefore, the present invention has been made in view of the above problems, and it is an object of the present invention to provide an apparatus and a method for automatically performing channel change of a TV using a VCR, in which channel change data from the VCR is remotely transmitted to the TV in a playback mode of the VCR, so that the current channel of the TV can automatically be changed to a video viewable channel.

It is another object of the present invention to provide an apparatus and a method for automatically performing channel change of a TV using a VCR, in which the channel change of the TV is performed simultaneously with the beginning of playback of the VCR according to a single command, so as to settle the trouble of operating a plurality of keys.

In accordance with one aspect of the present invention, there is provided an apparatus for automatically performing channel change of a television receiver using a video cassette recorder, comprising playback command detection means for detecting a playback command; channel sensing means for sensing a video viewable channel selected by a radio frequency changeover switch according to a user's selection; memory means for storing the video viewable channel sensed by the channel sensing means, television receiver channel change data and television receiver codes corresponding to different types of the television receiver; control means for reading one of the television receiver channel change data stored in the memory means corresponding to the video viewable channel sensed by the channel sensing means upon the detection of the playback command by the playback command detection means; and data transmission means for remotely transmitting the television receiver channel change data from the control means to the television receiver to change a current channel of the television receiver to the video viewable channel sensed by the channel sensing means in a playback mode of the video cassette recorder.

In accordance with another aspect of the present invention, there is provided an apparatus for automatically performing channel change of a television receiver using a video cassette recorder, comprising playback command detection means for detecting a playback command; memory means for storing a video viewable channel selected by a radio frequency changeover switch, television receiver channel change data and television receiver codes corresponding to different types of the television receiver; control means for controlling the radio frequency changeover switch and reading from the memory means one of the television receiver channel change data corresponding to the video viewable channel stored in the memory means upon the detection of the playback command by the playback command detection means; and data transmission means for remotely transmitting the television receiver channel change data from the control means to the television receiver to change a current channel of the television receiver to the video viewable channel stored in said memory means in a playback mode of the video cassette recorder.

In accordance with a further aspect of the present invention, there is provided an apparatus for automatically performing channel change of a television receiver using a video cassette recorder, comprising playback command detection means for detecting a playback command; channel sensing means for sensing a video viewable channel selected by a radio frequency changeover switch; memory means for storing television receiver codes corresponding to different types of the television receiver; control means for generating a channel control signal in response to the video viewable channel sensed by the channel sensing means and a reference frequency from reference frequency generation means upon the detection of the playback command by the playback command detection means; and data transmission means for remotely transmitting an infrared-ray signal to the television receiver in response to the channel control signal from the control means to change a current channel of the television receiver to the video viewable channel sensed by the channel sensing means in a playback mode of the video cassette recorder.

In accordance with a still further aspect of the present invention, there is provided a method of automatically performing channel change of a television receiver using a video cassette recorder, comprising the steps of matching the television receiver and the video cassette recorder in type, setting a video viewable channel and storing the set video viewable channel; detecting a playback command; reading television receiver channel change data from memory means upon detection of the playback command; and converting the read television receiver channel change data into a television receiver remote controller code and remotely transmitting the converted television receiver remote controller code to the television receiver.

BRIEF DESCRIPTION OF THE DRAWINGS

The above and other objects, features and advantages of the present invention will be more clearly understood from the following detailed description taken in conjunction with the accompanying drawings, in which:

FIG. 3 is a detailed block diagram of a controller in the apparatus in FIG. 2;

FIG. 4 is a flowchart illustrating a method of automatically performing the channel change of the TV using the VCR in accordance with the first embodiment of the present invention;

FIG. 5 is a flowchart illustrating a conventional method of learning TV remote controller codes;

FIGS. 6A and 6B are views illustrating on-screen display states in accordance with the present invention;

FIG. 7 is a view illustrating a general data format of each of the TV remote controller codes.

FIGS. 12A to 12C are waveform diagrams of signals from a channel control signal generator in the controller in FIG. 11A.

DETAILED DESCRIPTION OF THE PREFERRED EMBODIMENTS

Figure 1:
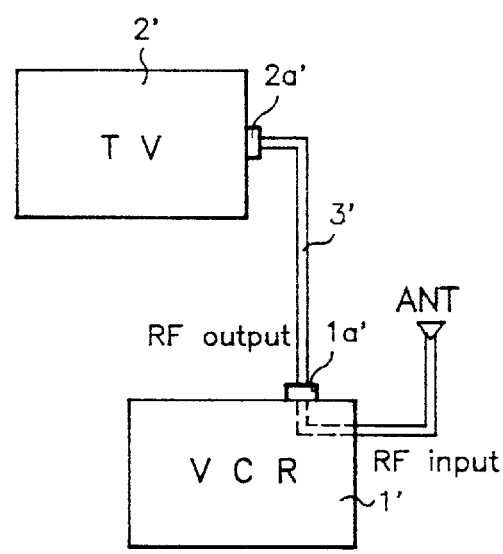
FIG. 1 is a view illustrating a general connection of a TV and a VCR.
Figure 2:
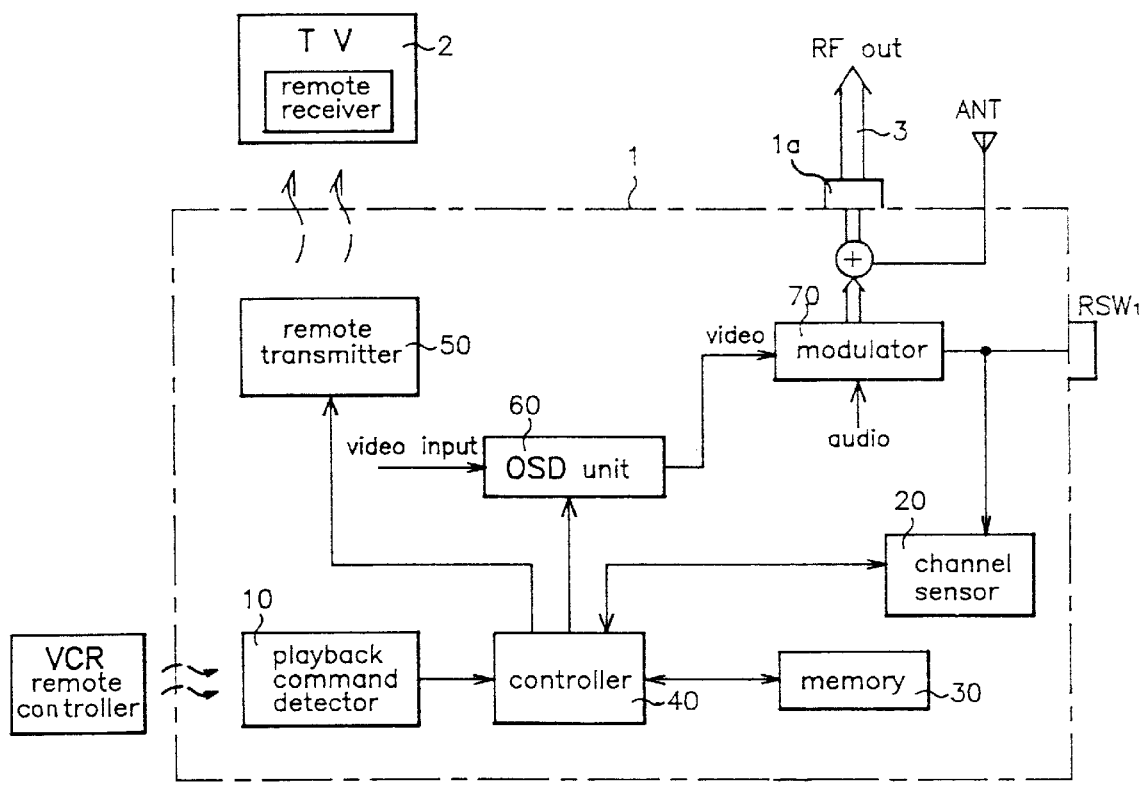
FIG. 2 is a block diagram of an apparatus for automatically performing channel change of a TV using a VCR in accordance with a first embodiment of the present invention.

Referring to FIG. 2, there is shown a block diagram of an apparatus for automatically performing channel change of a TV using a VCR in accordance with a first embodiment of the present invention. In this drawing, the TV and the VCR are designated by the reference numerals 2 and 1, respectively.

As shown in FIG. 22 the apparatus comprises a playback command detector 10 for detecting a playback command, a channel sensor 20 for sensing a video viewable channel which is selected by a mechanical RF changeover switch, RSW1, according to a user's selection, and a memory 30 for storing the video viewable channel sensed by the channel sensor 20, TV channel change data and TV codes corresponding to different types of the TV.

A controller 40 is adapted to compare the video viewable channel sensed by the channel sensor 20 with the video viewable channel stored in the memory 30 upon the detection of the playback command by the playback command detector 10, store the video viewable channel sensed by the channel sensor 20 into the memory 30 if it is different from the video viewable channel previously stored in the memory 30 in accordance with the compared result and read one of the TV channel change data stored in the memory 30 corresponding to the sensed video viewable channel.

A remote transmitter 50 is adapted to remotely transmit the TV channel change data from the controller 40 to the TV 2 to change the current channel of the TV 2 to the video viewable channel sensed by the channel sensor 20 in a playback mode of the VCR 1.

An on-screen display (OSD) unit 60 is adapted to display various characters under the control of the controller 40 and the TV codes stored in the memory 30 in a TV code setting mode under the control of the controller 40.

A modulator 70 is adapted to switch an output channel according to a switching operation of the RF changeover switch RSW1 and modulate a video signal from the OSD unit 60 and an audio signal.

The playback command detector 10 may be a remote receiver for receiving the playback command from a VCR remote controller. Alternatively, the playback command detector 10 may be a tape sensing switch SW1 for sensing insertion of a video tape into a VCR deck and generating the playback command in accordance with the sensed result or a playback key SW2 on a key panel for generating the playback command, as shown in FIG. 3.

Referring to FIG. 3, there is shown a detailed block diagram of the controller 40. As shown in this drawing, the controller 40 includes a decoder 41 for decoding the playback command detected by the remote receiver or the playback command generated based on ON/OFF states of the tape sensing switch SW1 or the playback key SW2, a central processing unit 43 for recognizing the playback mode of the VCR 1 and the channel change of the TV 2 in response to an output signal from the decoder 41 and the video viewable channel sensed by the channel sensor 20 and reading the corresponding TV channel change data from the memory 30 upon recognition of the channel change of the TV 2, and a channel change code generator 42 for converting the TV channel change data from the central processing unit 43 into a TV remote controller code and outputting the converted TV remote controller code to the remote transmitter 50.

The operation of the apparatus with the above-mentioned construction in accordance with the first embodiment of the present invention will hereinafter be described in detail with reference to FIGS. 4 to 7. FIG. 4 is a flowchart illustrating a method of automatically performing the channel change of the TV using the VCR in accordance with the first embodiment of the present invention, FIG. 5 is a flowchart illustrating a conventional method of learning TV remote controller codes, FIGS. 6A and 6B are views illustrating OSD states in accordance with the present invention and FIG. 7 is a view illustrating a general data format of each of the TV remote controller codes.

As known, the TV 2 and the VCR 1 may be of various makes. For this reason, the type TV 2 and the VCR 1 must be identified in order for the VCR remote controller to control the TV 2. For example, in the case where the VCR 1 is made by GOLDSTAR and the TV 2 is made by SAMSUNG, the VCR remote controller cannot control the TV 1 without matching the types of the VCR 2 and the TV 1.

First, the TV code setting is selected by using the VCR remote controller, and then the names of various TV makers are displayed by the OSD unit 60 as shown in FIG. 6A. The user selects one of the displayed TV makers corresponding to his TV, and the controller 40 recognizes the selected TV maker and stores the corresponding TV code into the memory 30 at step S10 of FIG. 4.

Alternatively, the TV remote controller codes may be learned by the VCR 1 and then stored into the memory 30 thereof, instead of mapping the various TV codes in the memory 30 and selecting a desired one of the mapped codes as mentioned above. The learning method is conventionally performed using a universal remote controller, and is shown in U.S. Pat. No. 4,623,887. The learning method will hereinafter be described with reference to the flowchart of FIG. 5.

Generally, the remote controller codes are 30 or more in type. For this reason, the code type is first discriminated at step S11 to check the type of the user's TV. The TV remote controller code is generally comprised of a leader portion, a custom portion and a data portion. The leader portion is a reference signal of a remote controller code pulse and the custom portion contains a code value for discrimination of the TV type.

After the discrimination of the code type at step S11, the custom code is extracted at step S12 and the TV maker is discriminated at step S13. Then, the discriminated code type, custom code and TV maker are stored into the memory 30 at step S14.

If the TV 2 and the VCR 1 are matched in type as mentioned above, the video viewable channel is set to 3 or 4 by the RF changeover switch RSW1 and then stored into the memory 30 at the step S20 of FIG. 4. Under this condition, if the tape sensing switch SW1 is turned on as the video tape is inserted into the VCR deck, the playback key SW2 is turned on, or the remote receiver receives the playback command from the VCR remote controller at the step S30, the decoder 41 decodes the playback command from the playback command detector 10 and applies the decoded signal to the central processing unit 43. Also, the decoder 41 controls the channel sensor 20 to sense the switching state of the RF changeover switch RSW1.

Upon receiving the decoded signal from the decoder 41, the central processing unit 43 checks the sensed result from the channel sensor 20 through the decoder 41. Namely, the central processing unit 43 compares the video viewable channel sensed by the channel sensor 20 with the video viewable channel stored in the memory 30. If the video viewable channels are the same as a result of the comparison, the central processing unit 43 reads the current TV channel change data from the memory 30 at the step S40.

On the contrary, if the video viewable channels are not the same as a result of the comparison, the central processing unit 43 stores the video viewable channel sensed by the channel sensor 20 into the memory 30 and reads from the memory 30 the TV channel change data corresponding to the sensed video viewable channel at step S40. Then, the central processing unit 43 outputs the read TV channel change data to the channel change code generator 42.

The channel change code generator 42 converts the TV channel change data from the central processing unit 43 into a channel change code, which is the same as channel key data of the TV remote controller, and outputs the converted channel change code to the remote transmitter 50. In response to the channel change code from the controller 40, the remote transmitter 50 transmits infrared channel key data to the TV 2 at step S50. The infrared data from the remote transmitter 50 is received by a remote receiver of the TV 2. In response to the received infrared data, a microcomputer in the TV 2 changes the current channel of the TV 2 to the video viewable channel.

Figure 8:
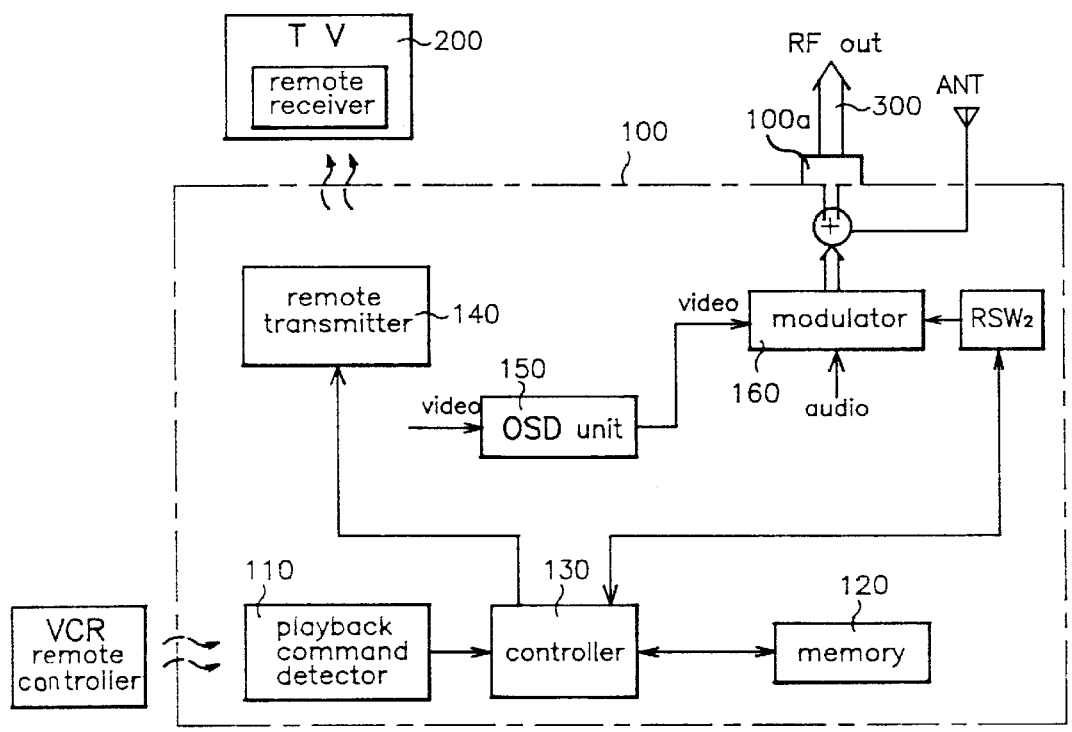
FIG. 8 is a block diagram of an apparatus for automatically performing channel change of a TV using a VCR in accordance with a second embodiment of the present invention.

Referring to FIG. 8, there is shown a block diagram of an apparatus for automatically performing channel change of a TV using a VCR in accordance with a second embodiment of the present invention. In this drawing, the TV and the VCR are designated by the reference numerals 200 and 100, respectively.

In accordance with the second embodiment of the present invention, the apparatus is adapted to automatically switch a video viewable channel utilizing an electronic RF changeover switch RSW2.

As shown in FIG. 8, the apparatus comprises a playback command detector 110 for detecting a playback command, a memory 120 for storing the video viewable channel selected by the electronic RF changeover switch RSW2, TV channel change data and TV codes corresponding to the different types of TVs, and a controller 130 for controlling the electronic RF changeover switch RSW2 and reading from the memory 120 one of the TV channel change data corresponding to the video viewable channel stored in the memory 120 upon the detection of the playback command by the playback command detector 110.

A remote transmitter 140 is adapted to remotely transmit the TV channel change data from the controller 130 to the TV 200 to change the current channel of the TV 200 to the video viewable channel stored in the memory 120 in a playback mode of the VCR 100.

An OSD unit 150 is adapted to display the video viewable channel and the TV codes stored in the memory 120 in channel and TV code setting modes under the control of the controller 130.

A modulator 160 is adapted to switch an output channel according to a switching operation of the RF changeover switch RSW2 and modulate a video signal from the OSD unit 150 and an audio signal.

The playback command detector 110 has the same construction as that of the playback command detector 10 in the first embodiment.

Figure 9:
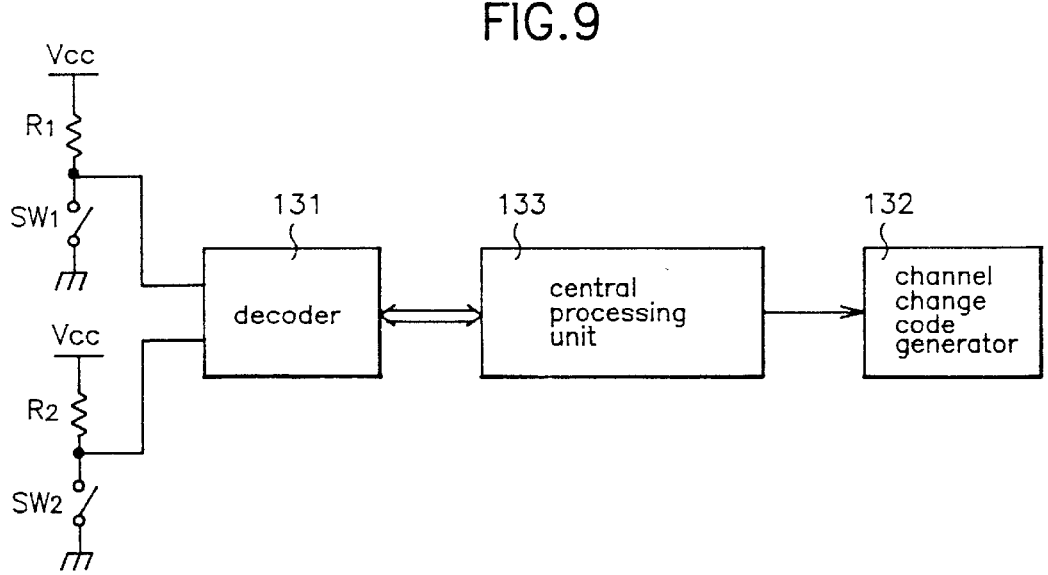
FIG. 9 is a detailed block diagram of a controller in the apparatus in FIG. 8.

Referring to FIG. 9, there is shown a detailed block diagram of the controller 130. As shown in this drawing, the controller 130 includes a decoder 131 for decoding the playback command detected by the remote receiver or the playback command generated based on ON/OFF states of the tape sensing switch SW1 or the playback key SW2, a central processing unit 133 for recognizing the video viewable channel stored in the memory 120 upon recognizing the playback mode of the VCR 100 in response to an output signal from the decoder 131 and reading the corresponding TV channel change data from the memory 120, and a channel change code generator 132 for converting the TV channel change data from the central processing unit 133 into a TV remote controller code and outputting the converted TV remote controller code to the remote transmitter 140.

The operation of the apparatus with the above-mentioned construction in accordance with the second embodiment of the present invention will hereinafter be described in detail.

The type matching of the TV 200 and the VCR 100 in the second embodiment is performed in the same manner as that in the first embodiment and description thereof will be omitted. The setting of the video viewable channel is automatically performed by the electronic RF changeover switch RSW2 under the control of the controller 130 in the second embodiment instead of being manually performed by the mechanical RF changeover switch RSW1 in the first embodiment.

Namely, when the user selects the channel setting mode using the VCR remote controller, a channel 3 or 4 learning mode is displayed on the screen by the OSD unit 150 as shown in FIG. 6B. Then, the user selects channel 3 or 4 and applies channel 3 or 4 key data of the TV remote controller to the VCR. In the VCR, a code corresponding to the received key data is stored into the memory 120, and the RF changeover switch RSW2 is controlled to be switched to the channel selected by the user. This learning method is typically performed using the universal remote controller, as well-known in the art.

Upon completion of the type matching of the TV 200 and the VCR 100 and the setting and storage of the video viewable channel as mentioned above, if the tape sensing switch SW1 is turned on, as the video tape is inserted into the VCR deck, the playback key SW2 is turned on, or the remote receiver receives tee playback command from the VCR remote controller, the decoder 131 decodes the playback command from the playback command detector 10 and applies the decoded signal to the central processing unit 133.

Upon receiving the decoded signal from the decoder 131, the central processing unit 133 recognizes the current video viewable channel stored in the memory 120 and reads the corresponding TV channel change data from the memory 120. Then, the central processing unit 133 outputs the read TV channel change data to the channel change code generator 132.

The channel change code generator 132 converts the TV channel change data from the central processing unit 133 into a channel change code, which is the same as channel key data of the TV remote controller, and outputs the converted channel change code to the remote transmitter 140. In response to the channel change code from the controller 130, the remote transmitter 140 transmits infrared channel key data to the TV 200. The infrared data from the remote transmitter 140 is received by a remote receiver of the TV 200. In response to the received infrared data, a microcomputer in the TV 200 changes the current channel of the TV 200 to the video viewable channel.

As hereinbefore described, in accordance with the second embodiment of the present invention, the video viewable channel is selected by the RF changeover switch RSW2 under the control of the controller 130 and then stored into the memory 120. Therefore, the controller 130 can recognize the video viewable channel selected by the RF changeover switch RSW2 by recognizing the video viewable channel stored in the memory 120. That is, the second embodiment of the present invention requires no channel sensor differently from the first embodiment.

Figure 10:
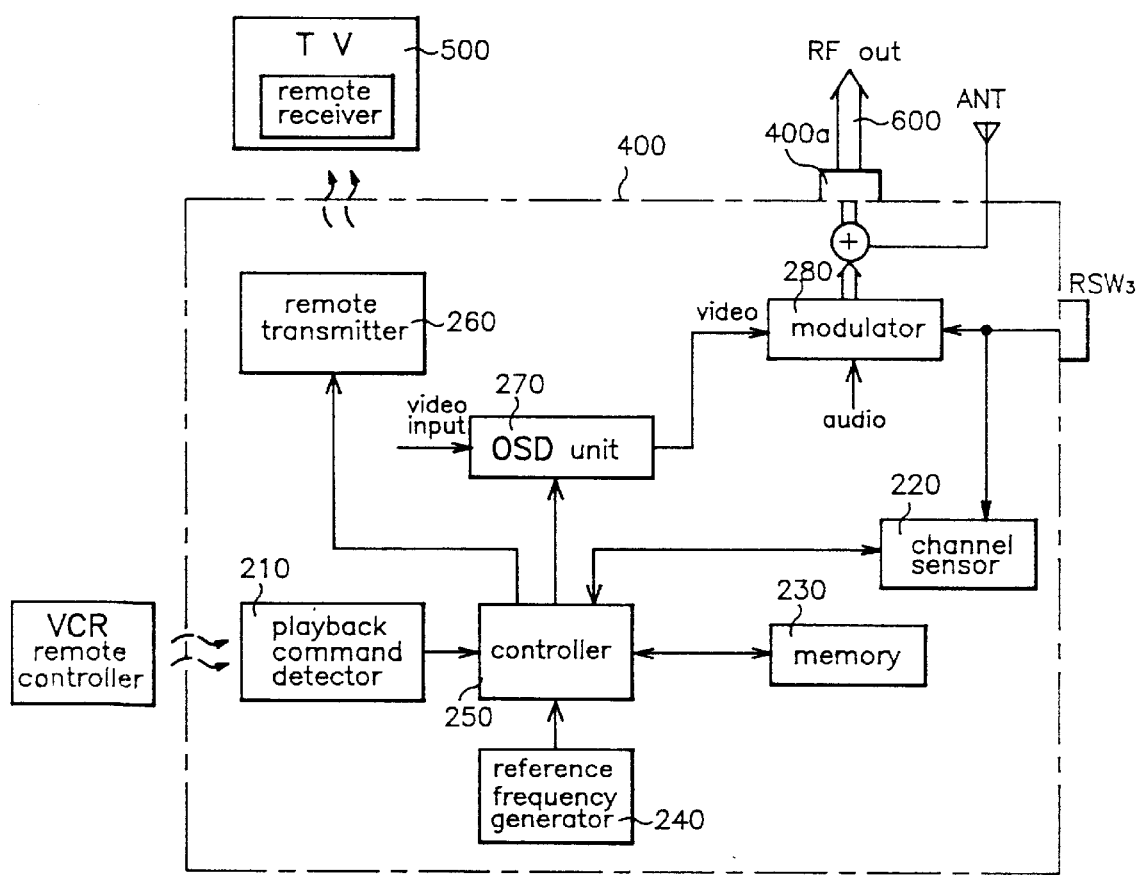
FIG. 10 is a block diagram of an apparatus for automatically performing channel change of a TV using a VCR in accordance with a third embodiment of the present invention.

FIG. 10 is a block diagram of an apparatus for automatically performing channel change of a TV using a VCR in accordance with a third embodiment of the present invention. In this drawing, the TV and the VCR are designated by the reference numerals 500 and 400, respectively.

In accordance with the third embodiment of the present invention, the apparatus is adapted to change a current channel of the TV 500 to a video viewable channel utilizing a reference frequency in accordance with the result of channel sensing.

As shown in FIG. 10, the apparatus comprises a playback command detector 210 for detecting a playback command, a channel sensor 220 for sensing a video viewable channel selected by an RF changeover switch RSW3, a memory 230 for storing TV codes corresponding to different types of TVs, and a controller 250 for generating a channel control signal in response to the video viewable channel sensed by the channel sensor 220 and a reference frequency from a reference frequency generator 240 upon the detection of the playback command by the playback command detector 210.

A remote transmitter 260 is adapted to transmit an infrared signal to the TV 500 in response to the channel control signal from the controller 250 to change the current channel of the TV 500 to the video viewable channel sensed by the channel sensor 220 in a playback mode of the VCR 400.

An OSD unit 270 is adapted to display the TV codes stored in the memory 230 in a TV code setting mode under the control of the controller 250.

A modulator 280 is adapted to switch an output channel according to a switching operation of the RF changeover switch RSW3 and modulate a video signal from the OSD unit 270 and an audio signal.

The playback command detector 210 has the same construction as that of the playback command detector 10 in the first embodiment.

Figure 11A:
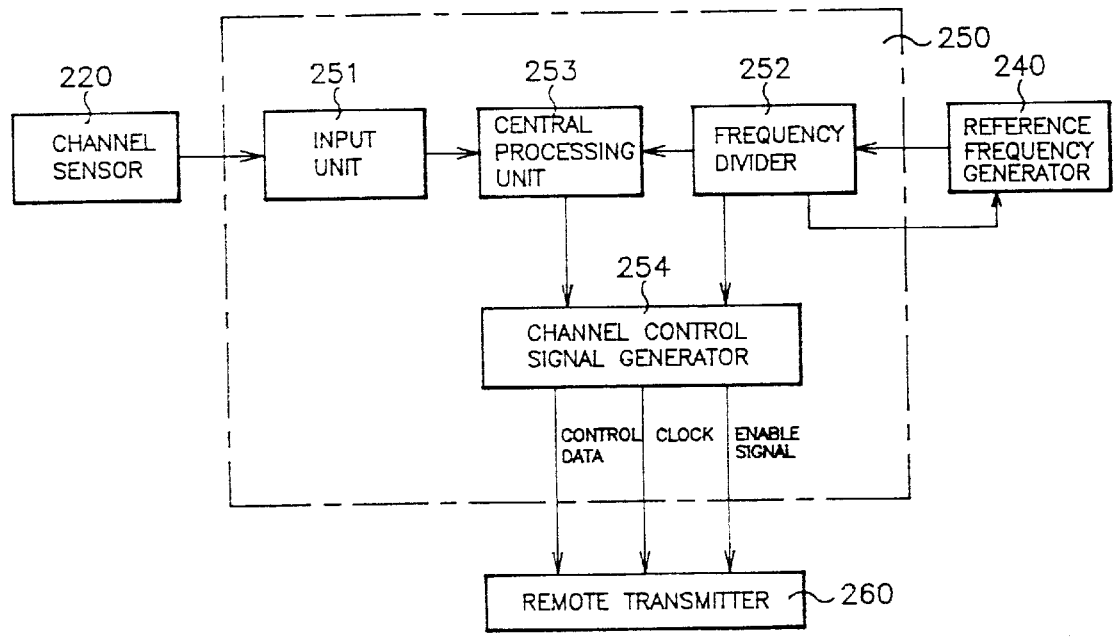
FIG. 11A is a detailed block diagram of a controller in the apparatus in FIG. 10.

FIG. 11A is a detailed block diagram of the controller 250. As shown in this drawing, the controller 250 includes an input unit 251 for inputting the video viewable channel sensed by the channel sensor 220, a frequency divider 252 for dividing the reference frequency from the reference frequency generator 240 by a desired level, a central processing unit 253 for generating a control signal in response to the video viewable channel inputted by the input unit 351 and an output frequency from the frequency divider 252, and a channel control signal generator 254 for generating the channel control signal in response to the control signal from the central processing unit 253, the channel control signal containing control data a reference clock and an enable signal.

Figure 11B:
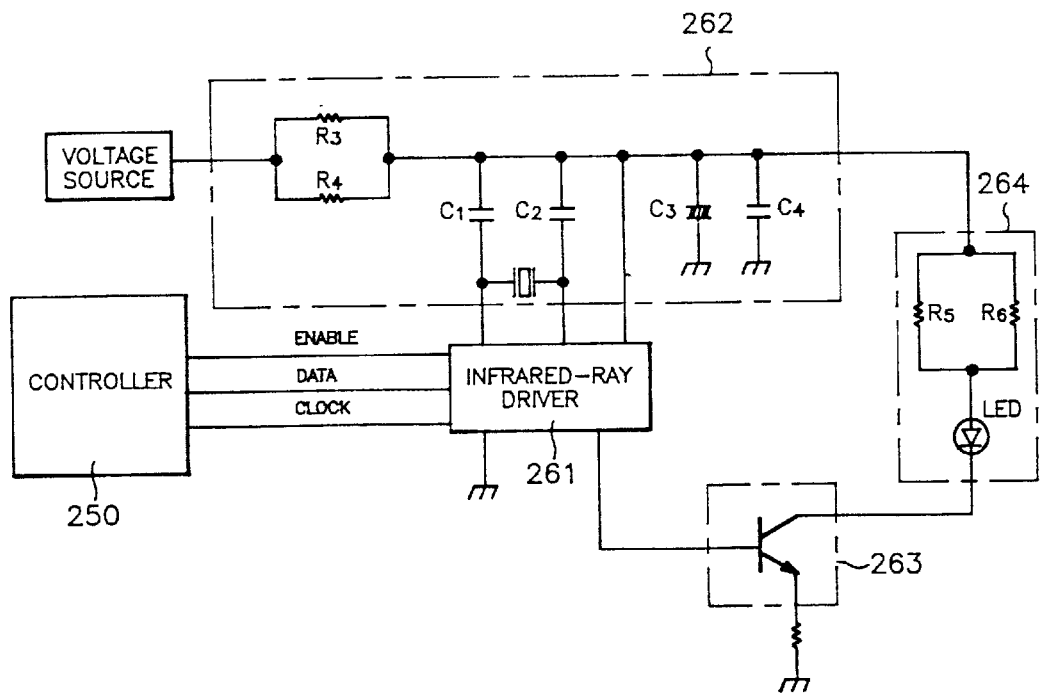
FIG. 11B is a detailed block diagram of a remote transmitter in the apparatus in FIG. 10.

FIG. 11B is a detailed block diagram of the remote transmitter 260. As shown in this drawing, the remote transmitter 260 includes an infrared driver 261 for generating an infrared drive signal in response to the channel control signal from the controller 250, an oscillator 262 for generating an oscillating frequency in response to the infrared drive signal from the infrared driver 261, a switching device 263 for performing a switching operation in response to the infrared drive signal from the infrared driver 261, and an infrared transmitter 264 for transmitting the infrared signal at the oscillating frequency from the oscillator 262 according to the switching operation of the switching device 263. The switching device 263 includes a switching transistor.

The operation of the apparatus with the above-mentioned construction in accordance with the third embodiment of the present invention will hereinafter be described in detail with reference to FIGS. 12A to 12C, which are waveform diagrams of the signals from the channel control signal generator 254 in the controller 250.

The type matching of the TV 500 and the VCR 400 in the third embodiment is performed in the same manner as that in the first embodiment and description thereof will thus be omitted. Upon the detection of the playback command by the playback command detector 210 or power-on, the channel sensor 220 senses whether the video viewable channel is 3 or 4. In other words, the channel sensor 220 senses the video viewable channel upon power supply from a power supply circuit (not shown) or under the control of the controller 250.

The controller 250 recognizes the video viewable channel in accordance with the sensed result from the channel sensor 220 and generates the corresponding channel control signal in response to the external reference frequency, as will hereinafter be described in more detail.

In the controller 250, the input unit 251 inputs the video viewable channel sensed by the channel sensor 220 and applies the inputted video viewable channel to the central processing unit 253. Also, the frequency divider 252 inputs the reference frequency from the reference frequency generator 240, divides the inputted reference frequency by the desired level and applies the divided frequency to the central processing unit 253. Then, the central processing unit 253 generates the control signal in response to the video viewable channel inputted by the input unit 351 and the output frequency from the frequency divider 252, and outputs the generated control signal to the channel control signal generator 254.

In response to the control signal from the central processing unit 253, the channel control signal generator 254 generates the reference clock as shown in FIG. 12A, the control data as shown in FIG. 12B and the enable signal as shown in FIG. 12C at the output frequency from the frequency divider 252. The reference clock, the control data, and the enable signal from the channel control signal generator 254 are applied to the remote transmitter 260. From FIG. 12C, it can be seen that the data input is enabled during only high intervals of the enable signal. This has the effect of avoiding unnecessary data input.

The remote transmitter 260 transmits the infrared signal corresponding to the sensed video viewable channel to the TV 500 in response to the reference clock, the control data and the enable signal from the controller 250, as will hereinafter be described in more detail.

In the remote transmitter 260, the infrared driver 261 generates the infrared drive signal in response to the reference clock, the control data and the enable signal from the controller 250, to cause the oscillator 262 to generate the oscillating frequency. The oscillating frequency from the oscillator 262 is applied to the infrared transmitter 264. Also, the transistor of the switching device 263 is turned on in response to the infrared drive signal from the infrared driver 261. With the transistor turned on, the infrared transmitter 264 transmits the infrared signal through its infrared light emitting diode LED at the oscillating frequency from the oscillator 262.

The infrared signal from the remote transmitter 260 is received by a remote receiver of the TV 500. In response to the received infrared signal, a microcomputer in the TV 500 changes the current channel of the TV 500 to the video viewable channel.

On the other hand, the transfer of the infrared signal from the VCR to the TV may be weak in level because of an installed position of the VCR. To solve this problem, a plurality of infrared light emitting diodes may be provided in consideration of the possessing space and cost of the VCR. Also, the channel change of the TV is performed in the same manner upon the power-on or the automatic playback mode as well as upon the insertion of the video tape into the video deck, the operation of the playback key on the key panel or the reception of the playback command from the VCR remote controller.

As apparent from the above description, according to the present invention, the current channel of the TV is automatically changed to the video viewable channel set by the user upon the power-on or the playback mode. Therefore, the channel change of the TV is performed simultaneously with the playback of the VCR according to the single command. This has the effect of eliminating the trouble of operating the VCR remote controller and the TV remote controller individually. Also, since the current channel of the TV is not manually changed to the video viewable channel, there can be prevented misrecognition of a normal state of the VCR or the TV as a faulty state or a reception incapable state due to unskilled operation of the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for automatically changing the channel of a television receiver using a video cassette recorder, comprising:

video playback mode detection means for detecting a video playback mode;

channel sensing means for sensing a predetermined video viewable channel;

memory means for storing the video viewable channel sensed by said channel sensing means and television receiver channel change data;

control means, located in the video cassette recorder, for reading the television receiver channel change data stored in said memory means and generating a channel changeover command corresponding to the video viewable channel sensed by said channel sensing means to change a television receiver channel upon the detection of the video playback mode; and data transmission means for remotely transmitting the channel changeover command from said control means to a remote control input port of the television receiver to cause the television receiver to change a current channel of the television receiver to the video viewable channel sensed by said channel sensing means in the video playback mode.

2. An apparatus for automatically performing channel change of a television receiver as set forth in claim 1, wherein said video playback mode detection means includes:

a remote receiver for receiving a playback command from a video cassette recorder remote controller and applying the received playback command to said control means.

3. An apparatus for automatically performing channel change of a television receiver as set forth in claim 1, wherein said video playback mode detection means includes:

a tape sensing switch for sensing insertion of a video tape into a deck of a video cassette recorder and applying the sensed result as a playback command to said control means.

4. An apparatus for automatically performing channel change of a television receiver as set forth in claim 1, wherein said video viewable channel signal is generated by a radio frequency changeover switch.

5. An apparatus for automatically performing channel change of a television receiver as set forth in claim 1, wherein said video playback mode detection means outputs a playback command and said control means includes:

a decoder for decoding the playback command from said playback command detection means and outputting a channel change signal to the television receiver;

a central processing unit for recognizing the playback mode of the video cassette recorder and the channel change of the television receiver in response to the channel change signal from said decoder and the video viewable channel signal sensed by said channel sensing means and reading the corresponding television receiver channel change data from said memory means upon recognition of the channel change of the television receiver; and a channel change code generator for converting the television receiver channel change data from said central processing unit into the channel changeover command and outputting the channel changeover command to said data transmission means.

6. An apparatus for automatically performing channel change of a television receiver as set forth in claim 1, further comprising:

on-screen display means for displaying on the television receiver the television receiver codes stored in said memory means when a television receiver code setting mode is set under the control of said control means.

7. An apparatus for automatically changing the channel of a television receiver using a video cassette recorder, comprising:

playback mode detection means for detecting a video playback mode;

channel sensing means for sensing a predetermined video viewable channel:

memory means for storing the video viewable channel, television receiver channel change data, and television receiver codes corresponding to different types of television receivers;

control means, located in the video cassette recorder, for reading the television receiver channel change data stored in said memory means and generating a television receiver channel change code corresponding to the video viewable channel signal stored in said memory means upon the detection of the video playback mode; and data transmission means for remotely transmitting the television receiver channel change code from said control means to a remote control input port of the television receiver to cause the television receiver to change a current channel of the television receiver to the video viewable channel stored in said memory means during a playback mode of the video cassette recorder.

8. An apparatus for automatically performing channel change of a television receiver as set forth in claim 7, further including a radio frequency changeover switch for generating said video viewable channel signal, said radio frequency changeover switch is switched by the control means to the channel selected by a user.

9. An apparatus for automatically performing channel change of a television receiver as set forth in claim 7, wherein the playback mode detection means outputs a playback command and said control means includes:

a decoder for decoding the playback command from said playback mode detection means;

a central processing unit for recognizing the video viewable channel signal stored in said memory means upon recognizing the playback mode of the video cassette recorder in response to an output signal from said decoder and reading the corresponding television receiver channel change data from said memory means; and a channel change code generator for converting the television receiver channel change data from said central processing unit into the television receiver channel change code and outputting the television receiver channel change code to said data transmission means.

10. An apparatus for automatically performing channel change of a television receiver as set forth in claim 7, further comprising:

on-screen display means for displaying on the television receiver the video viewable channel and the television receiver codes stored in said memory means, when in channel and television receiver code setting modes, under the control of said control means.

11. An apparatus for automatically changing a channel of a television receiver to a video viewing channel upon activation of playback video of a video cassette recorder connected to the television receiver, comprising:

video playback command detection means for detecting a video playback command;

channel sensing means for sensing a predetermined video viewable channel;

means for storing the video viewable channel sensed by the channel sensing means, and television receiver codes corresponding to different types of television receivers;

reference frequency generation means for generating a reference frequency;

control means for generating a channel control signal in response to the video viewable channel signal sensed by said channel sensing means and the reference frequency from the reference frequency generation means upon the detection of the video playback command by said playback command detection means; and data transmission means for remotely transmitting an infrared signal to a remote control input port of the television receiver in response to the channel control signal from said control means to cause the television receiver to change a current channel of the television receiver to the video viewable channel sensed by said channel sensing means in a playback mode of the video cassette recorder.

12. An apparatus for automatically performing channel change of a television receiver using a video cassette recorder, as set forth in claim 11, wherein said control means includes:

an input unit for inputting the video viewable channel sensed by said channel sensing means;

a frequency divider for dividing the reference frequency from said reference frequency generation means by a desired level;

a central processing unit for generating a control signal in response to the video viewable channel inputted by said input unit and an output frequency from said frequency divider; and a channel control signal generator for generating the channel control signal in response to the control signal from said central processing unit, the channel control signal containing control data, a reference clock and an enable signal.

13. An apparatus for automatically performing channel change of a television receiver using a video cassette recorder, as set forth in claim 12, wherein said data transmission means includes:

an infrared driver for generating an infrared drive signal in response to the channel control signal from said control means;

an oscillator for generating an oscillating frequency in response to the infrared drive signal from said infrared driver;

a switching device for performing a switching operation in response to the infrared drive signal from said infrared driver; and an infrared transmitter for transmitting the infrared signal at the oscillating frequency from said oscillator according to the switching operation of said switching device.

14. An apparatus for automatically performing channel change of a television receiver using a video cassette recorder, as set forth in claim 13, wherein said switching device includes a switching transistor.

15. An apparatus for automatically performing channel change of a television receiver using a video cassette recorder, as set forth in claim 11, further comprising:

on-screen display means for displaying on the television receiver the television receiver codes stored in said memory means in a television receiver code setting mode under the control of said control means.

16. A method of automatically performing channel change of a television receiver using a video cassette recorder, comprising the steps of:

sensing a predetermined video viewable channel;

matching a type of the television receiver and a type of the video cassette recorder;

storing the sensed video viewable channel;

detecting a playback command;

reading television receiver channel change data from memory means upon detection of the playback command;

converting the read television receiver channel change data into a television receiver channel change code; and remotely transmitting the converted television receiver channel change code from the video cassette recorder to a remote control input port of the television receiver to change a current channel of the television receiver to the set video viewable channel.

* * * * *

UNITED STATES PATENT AND TRADEMARK OFFICE
CERTIFICATE OF CORRECTION

PATENT NO. : 5,886,847
DATED : March 23, 1999
INVENTOR(S) : Lee et al.

It is certified that error appears in the above-identified patent and that said Letters Patent is hereby corrected as shown below:

Claim 11, col. 12, line 47, before, "means", insert --memory--.

Signed and Sealed this

Sixteenth Day of November, 1999

Attest:

Q. TODD DICKINSON

*Attesting Officer*  *Acting Commissioner of Patents and Trademarks*